United States Patent
Bostick et al.

(10) Patent No.: US 10,423,797 B2
(45) Date of Patent: Sep. 24, 2019

(54) SKULL CONDUCTION-BASED TELEPHONIC CONVERSATION MANAGEMENT

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 15/464,410

(22) Filed: Mar. 21, 2017

(65) Prior Publication Data

US 2018/0276395 A1 Sep. 27, 2018

(51) Int. Cl.
| | |
|---|---|
| *H04L 29/06* | (2006.01) |
| *G06F 21/60* | (2013.01) |
| *H04L 12/18* | (2006.01) |
| *G06F 21/62* | (2013.01) |
| *G06F 3/16* | (2006.01) |
| *G06F 21/32* | (2013.01) |
| *H04L 29/08* | (2006.01) |
| *G10L 15/26* | (2006.01) |

(52) U.S. Cl.
CPC ............ *G06F 21/604* (2013.01); *G06F 3/165* (2013.01); *G06F 21/32* (2013.01); *G06F 21/6218* (2013.01); *H04L 12/1895* (2013.01); *H04L 63/0861* (2013.01); *H04L 65/1086* (2013.01); *H04L 65/403* (2013.01); *G10L 15/26* (2013.01); *H04L 63/102* (2013.01); *H04L 67/306* (2013.01)

(58) Field of Classification Search
CPC ..... G06F 21/604; G06F 3/165; H04L 67/306; H04L 63/0861
USPC .............................................................. 726/1
See application file for complete search history.

(56) References Cited

U.S. PATENT DOCUMENTS

| | | | |
|---|---|---|---|
| 8,249,234 B2 | 8/2012 | Miller et al. | |
| 8,284,905 B1* | 10/2012 | Suri ................... | H04M 3/2281 379/265.07 |
| 2010/0082342 A1* | 4/2010 | Erhart .................. | G10L 21/045 704/246 |

(Continued)

OTHER PUBLICATIONS

Owano, "Authentication may be all in your head through SkullConduct", Tech Xplore, Apr. 23, 2016, 3 pages. https://techxplore.com/news/2016-04-authentication-skullconduct.html.

(Continued)

*Primary Examiner* — Evans Desrosiers
(74) *Attorney, Agent, or Firm* — Yee & Associates, P.C.; Brian Restauro (57) ABSTRACT

Managing access to confidential content is provided. An indication of an identity of a teleconference participant is received via a voice communication headset that includes a skull conduction speaker and microphone. A database is analyzed to identify confidential information the teleconference participant is not authorized to hear. Voice communication content is provided in real time to the teleconference participant. The identified confidential information the teleconference participant is not authorized to hear is muted in the voice communication content.

18 Claims, 7 Drawing Sheets

(56) References Cited

U.S. PATENT DOCUMENTS

2012/0143596 A1 6/2012 Bhogal et al.

OTHER PUBLICATIONS

Schneegass et al., "SkullConduct: Biometric User Identification on Eyewear Computers Using Bone Conduction Through the Skull", Proceedings of the 2016 CHI Conference on Human Factors in Computing Systems, May 2016, 6 pages.

Tsuge et al., "Speaker Verification Method using Bone-conduction and air-conduction speech", 2009 International Symposium on Intelligent Signal Processing and Communication Systems (ISPACS), Jan. 2009, pp. 449-452.

Young, "SkullConduct Identifies People via Unique Sound Readings", Trend Hunter Inc., Apr. 27, 2016, 2 pages. http://www.trendhunter.com/trends/skullconduct.

Zimmerman, "Biometrics and User Authentication", SANS Institute, © 2002, 9 pages.

\* cited by examiner

SKULL CONDUCTION-BASED TELEPHONIC CONVERSATION MANAGEMENT

BACKGROUND

1. Field

The disclosure relates generally to telephonic voice communication management and more specifically to managing an ability of teleconference participants to hear confidential content in teleconference voice communications using skull conduction frequency biometric identification of the teleconference participants.

2. Description of the Related Art

During telephonic voice communications, people sometimes mistakenly say the wrong thing. For example, a person may share confidential content or information with an unauthorized individual simply because the person forgot who exactly the person was talking to and that that particular individual was not supposed to hear information regarding a particular topic. This concept of forgetting who exactly is on the line and what information should not be shared is more prevalent during teleconference calls that include a large number of individuals. For example, group A may be participating in a teleconference with group B when a person in group B inadvertently starts talking about confidential information regarding a planned company restructuring of group A. In this example, the company did not want group A personnel to hear this information prior to public release because the restructuring of group A may never occur or the restructuring may merely be a switching of job roles. However, now that group A personnel have heard the confidential information regarding the planned company restructuring of group A, group A personnel may go into panic mode, spread unfounded rumors, and/or quit their jobs causing chaos in the company needlessly.

SUMMARY

According to one illustrative embodiment, a computer-implemented method for managing access to confidential content is provided. A computer receives an indication of an identity of a teleconference participant via a voice communication headset that includes a skull conduction speaker and microphone. The computer analyzes a database to identify confidential information the teleconference participant is not authorized to hear. The computer provides voice communication content in real time to the teleconference participant. The computer mutes the identified confidential information the teleconference participant is not authorized to hear in the voice communication content. According to other illustrative embodiments, a computer system and computer program product for managing access to confidential content are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
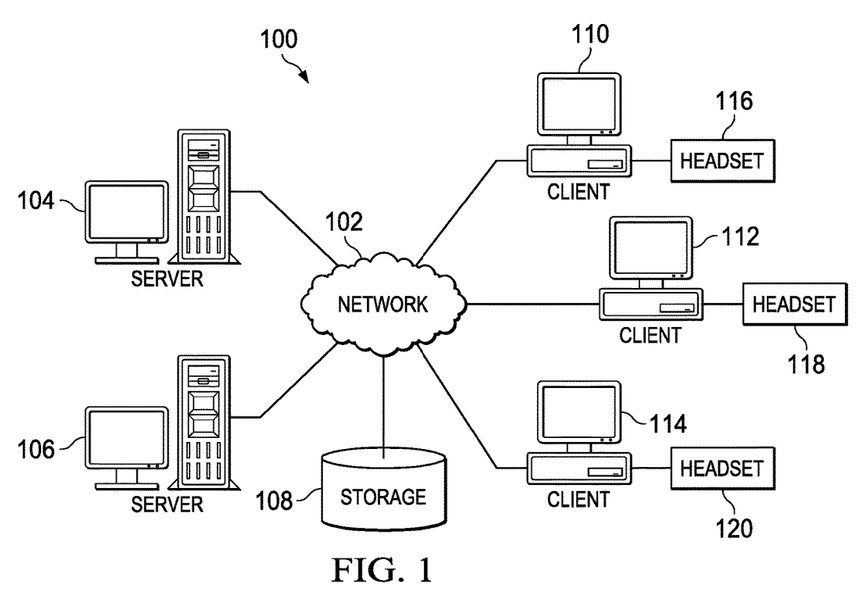
FIG. 1 is a pictorial representation of a network of data processing systems in which illustrative embodiments may be implemented.
Figure 2:
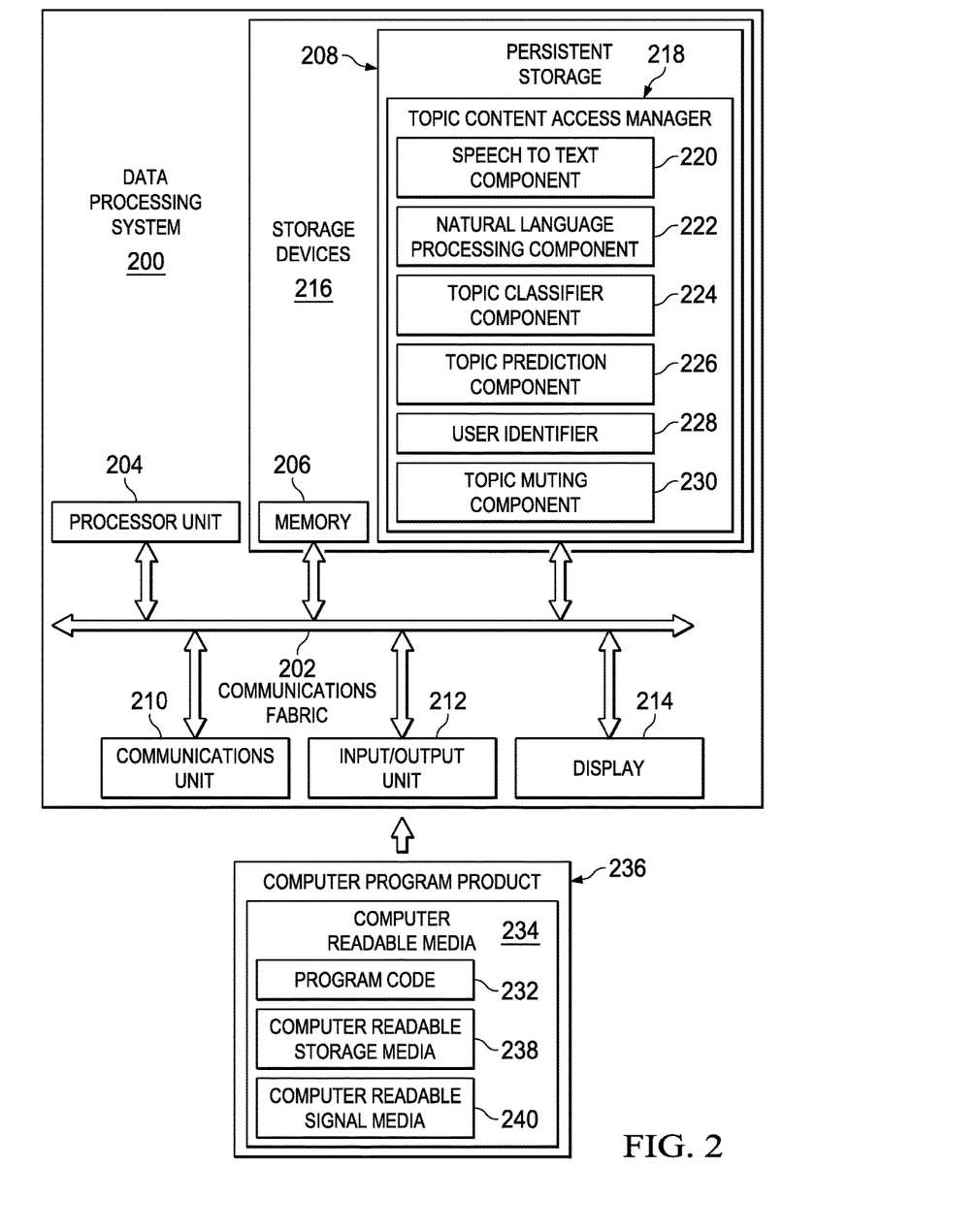
FIG. 2 is a diagram of a data processing system in which illustrative embodiments may be implemented.
Figure 3:
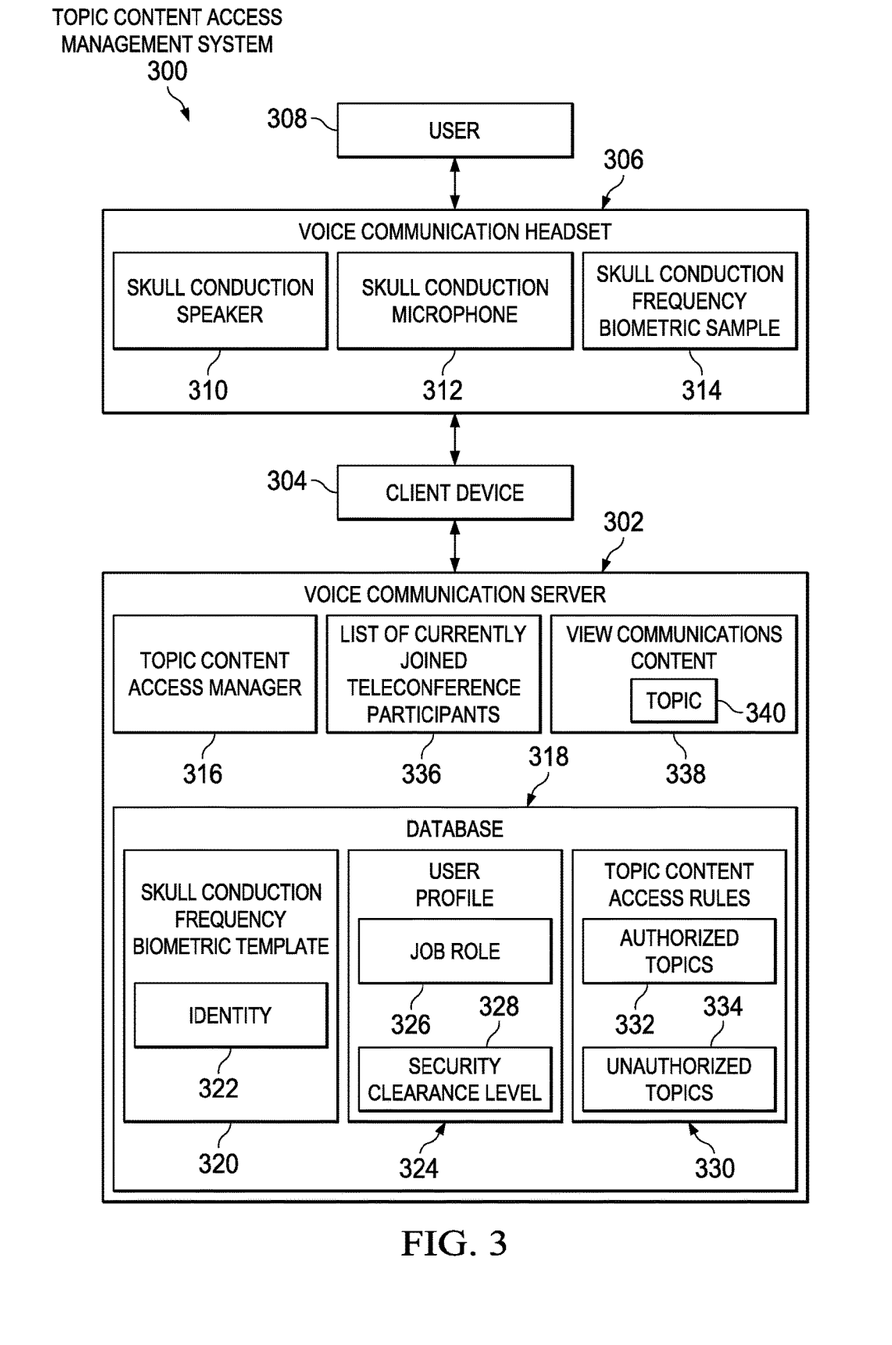
FIG. 3 is a diagram illustrating an example of a topic content access management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, voice communication headsets, and other devices in which the illustrative embodiments may be implemented. Network data processing system 100 contains network 102, which is the medium used to provide communications links between the computers, data processing systems, voice communication headsets, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide voice communication services, such as, for example, telephonic services, teleconferencing services, video conferencing services, online gaming services, and the like, to client devices. Also, it should be noted that server 104 and server 106 may each represent a plurality of different servers providing a plurality of different voice communication services. Furthermore, server 104 and server 106 may provide other services, such as, for example, confidential information monitoring and filtering to prevent unauthorized client device users from hearing certain content contained in voice communications between two or more client devices.

Client 110, client 112, and client 114 also connect to network 102. Clients 110, 112, and 114 are clients of server 104 and server 106. Further, server 104 and server 106 may provide information, such as software applications and programs to clients 110, 112, and 114.

In this example, clients 110, 112, and 114 are illustrated as desktop or personal computers with wire or wireless communication links to network 102. However, it should be noted that clients 110, 112, and 114 are meant as examples only. In other words, clients 110, 112, and 114 may include other types of data processing systems, such as, for example, laptop computers, handheld computers, smart phones, cellular phones, smart televisions, smart watches, gaming devices, and the like, with wire or wireless communication links to network 102. Users of clients 110, 112, and 114 may utilize clients 110, 112, and 114 to access the voice communication services provided by server 104 and server 106.

Also in this example, headset 116, headset 118, and headset 120 are coupled to client 110, client 112, and client 114, respectively, via wired or wireless communication links. Users of clients 110, 112, and 114 utilize headsets 116, 118, and 120 to conduct voice communications with other client devices. Moreover, it should be noted that headsets 116, 118, and 120 are equipped with skull conduction frequency biometric sample measuring and recording technology to uniquely identify a respective user of headset 116, headset 118, and headset 120.

Storage 108 is a network storage device capable of storing any type of data in a structured format or an unstructured format. In addition, storage 108 may represent a set of one or more network storage devices. Storage 108 may store, for example, names and identification numbers for a plurality of different client device users; skull conduction frequency biometric templates corresponding to each of the different client device users; job roles corresponding to each of the different client device users; security clearance levels corresponding to each of the different client device users; topic content access rules corresponding to each of the different job roles and security clearance levels, and the like. Further, storage 108 may store other data, such as authentication or credential data that may include user names, passwords, and other types of biometric data associated with the client device users, privileged users, and system administrators, for example.

In addition, it should be noted that network data processing system 100 may include any number of additional server devices, client devices, headsets, and other devices not shown. Program code located in network data processing system 100 may be stored on a computer readable storage medium and downloaded to a computer or data processing system for use. For example, program code may be stored on a computer readable storage medium on server 104 and downloaded to client 110 and/or headset 116 over network 102 for use on client 110 and/or headset 116.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores topic content access manager 218. Topic content access manager 218 automatically identifies and controls access to confidential content discussed in voice communications between two or more users of headsets coupled to client devices, such as headsets 116, 118, and 120 coupled to clients 110, 112, and 114 in FIG. 1, via voice communication services provided by data processing system 200. It should be noted that even though topic content access manager 218 is illustrated as residing in persistent storage 208, in an alternative illustrative embodiment topic content access manager 218 may be a separate component of data processing system 200. For example, topic content access manager 218 may be a hardware component coupled to communication fabric 202 or a combination of hardware and software components. In another alternative illustrative embodiment, a first set of components of topic content access manager 218 may be located in data processing system 200 and a second set of one or more components of topic content access manager 218 may be located in a headset coupled to a client device.

In this example, topic content access manager 218 includes speech to text component 220, natural language processing component 222, topic classifier component 224, topic prediction component 226, user identifier 228, and topic muting component 230. However, it should be noted that topic content access manager 218 may include more or fewer components than shown. For example, different illustrative embodiments may combine two or more components into one component, divide one component into two or more components, or add other components not shown.

Topic content access manager 218 utilizes speech to text component 220 to convert real time voice communication speech into a textual format for analysis. Topic content access manager 218 utilizes natural language processing component 222 to process and analyze the text of the voice communications to determine content and context of the voice communications. Topic content access manager 218 utilizes topic classifier component 224 to classify the analyzed text into one or more topics currently being discussed in the voice communications. In addition, topic content access manager 218 utilizes topic prediction component 226 to predict upcoming topics in the voice communications based on a stored list of keywords and phrases that correspond to specific topics.

Topic content access manager 218 utilizes user identifier 228 to specifically identify each participant in the voice communications based on matching skull conduction frequency biometric samples, which are received from the headsets used by each of the participants, with skull conducted frequency biometric templates stored in a database, such as storage 108 in FIG. 1. A match between a skull conduction frequency biometric sample and a skull conduction frequency biometric template specifically identifies an individual because each particular template is mapped to one particular individual. Topic content access manager 218 utilizes topic muting component 230 to mute confidential voice communication content of a particular topic in response to topic content access manager 218 determining that a particular participant in the voice communication is not authorized to hear that particular topic based on stored topic content access rules.

Communications unit 210, in this example, provides for communication with other computers, data processing systems, and client devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 232 is located in a functional form on computer readable media 234 that is selectively removable and may be loaded onto or transferred to data processing system 200 for running by processor unit 204. Program code 232 and computer readable media 234 form computer program product 236. In one example, computer readable media 234 may be computer readable storage media 238 or computer readable signal media 240. Computer readable storage media 238 may include, for example, an optical or magnetic disc that is inserted or placed into a drive or other device that is part of persistent storage 208 for transfer onto a storage device, such as a hard drive, that is part of persistent storage 208. Computer readable storage media 238 also may take the form of a persistent storage, such as a hard drive, a thumb drive, or a flash memory that is connected to data processing system 200. In some instances, computer readable storage media 238 may not be removable from data processing system 200.

Alternatively, program code 232 may be transferred to data processing system 200 using computer readable signal media 240. Computer readable signal media 240 may be, for example, a propagated data signal containing program code 232. For example, computer readable signal media 240 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 232 may be downloaded over a network to persistent storage 208 from another device or data processing system through computer readable signal media 240 for use within data processing system 200. For instance, program code stored in a computer readable storage media in a data processing system may be downloaded over a network from the data processing system to data processing system 200. The data processing system providing program code 232 may be a server computer, a client computer, or some other device capable of storing and transmitting program code 232.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 238 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments utilize skull conduction frequency detection capabilities to accurately identify an individual and, thus, illustrative embodiments are able to control what that individual hears during a telephonic voice communication based on the identity of the individual, a job role corresponding to the individual, and a security clearance level corresponding to the individual by mapping the job role and security clearance level of the individual to topic content access rules that identify what topics the individual is authorized to hear and what topics the individual is not authorized to hear. Illustrative embodiments integrate a telephonic headset or other type of voice communication headset with skull conduction frequency biometric capturing technology. In addition, illustrative embodiments automatically determine a topic being discussed between teleconference participants and make real time decisions based on collected information so that participants not authorized to hear confidential information are automatically prevented from hearing the confidential information during the telephonic voice communication. For example, illustrative embodiments may drop one or more voice communication channels or lines or temporarily mute the one or more voice communication channels corresponding to participants not authorized to hear the confidential information while the confidential information is being discussed during the telephonic voice communication. Further, illustrative embodiments become smarter over time as illustrative embodiments learn words and phrases corresponding to different topics.

As a result, illustrative embodiments only allow authorized individuals to listen to spoken confidential information during a one-to-one telephonic voice communication session, a teleconferencing session, a video conferencing session, an online multi-player gaming session, or other type of electronic voice communication session or connection. Illustrative embodiments utilize technology that identifies individuals by their respective skull conduction frequency biometric, which is detected, recorded, and transmitted by their voice communication headsets, and use a server computer to verify the identity of each participating individual. Real time understanding of ongoing spoken content through classification techniques and other techniques allow illustrative embodiments to understand what topic is being discussed and to take appropriate action in real time when a particular confidential topic may not be appropriate for a particular individual to hear.

Illustrative embodiments integrate a skull conduction speaker and microphone into the voice communication headset to measure and record the skull conduction frequency biometric sample corresponding to an audio signal sent through the user's skull. A skull conduction frequency biometric sample is unique to each individual. Illustrative embodiments automatically filter confidential voice communication content to an individual based on the identity of the individual and the individual's job role and security level clearance.

Illustrative embodiments identify confidential spoken content, such as, for example, date of birth, account number, deal amount, and the like, by analyzing the voice communication content using natural language processing and classification techniques. Illustrative embodiments map a skull conduction frequency biometric sample of a user to a stored skull conduction frequency template to accurately identify the user. Then, illustrative embodiments map the identity of the user to the user's job role and security clearance level. Illustrative embodiments also map the user's job role and security clearance level to a set of one or more topic content access rules that identify authorized and unauthorized topics for that user. Illustrative embodiments treat a user not utilizing a voice communication headset or using a headset that is not capable of recording a skull conduction frequency biometric sample as unauthorized to hear confidential information during a telephonic voice communication and will require authorization from a privileged user or system administrator, for example, for that particular type of user to hear confidential information.

Illustrative embodiments perform this process in real time according to a programmatically discovered classification of the current topic being discussed. In addition, illustrative embodiments may predict upcoming topics by utilizing a word or phrase threshold level or count to learn words and phrases, which individuals have used over time regarding certain topics, to allow illustrative embodiments to predict an upcoming topic or subject. Further, illustrative embodiments prevent amplification beyond the voice communication headset. In other words, illustrative embodiments do not allow an audio stream sent to one voice communication headset to be split and sent to another voice communication headset.

Each user is pre-registered in a process that may be verified by a privileged user or system administrator, for example. This pre-registration process provides for mapping of users to skull conduction frequency biometric templates. A company or organization can map the identify (e.g., name and identification number), skull conduction frequency biometric sample, job role, and security clearance level corresponding to a user to the skull conduction frequency biometric template and share this mapping with the voice communication server computer. Illustrative embodiments require this one-time registration process for each participating user.

A privileged user or system administrator having proper authority may set up a person-to-person or multi-person teleconference call in advance. The privileged user or system administrator may designate a teleconference as open so that illustrative embodiments will not monitor and filter voice communication content. Alternatively, the privileged user or system administer may designate a teleconference as restricted so that illustrative embodiments will authenticate identity of each participant, monitor the voice communication content using natural language processing, and filter confidential information contained in the voice communication content to authorized participants only based on topic content access rules corresponding to each participant. The privileged user or system administrator may override illustrative embodiments to allow unauthorized participants to hear the confidential information.

A company or organization may define and set up the topic content access rules corresponding to different job roles and security clearance levels. Illustrative embodiments utilize a database or knowledge-base on a per person level to store, for example: 1) a user's known skull conduction frequency template; 2) the user's identity; 3) the user's job role; 4) the user's security clearance level; 5) specific topics the user is authorized to hear, which overrides the job role or security clearance level settings for the user; and 6) specific topics the user is not authorized to hear, which also overrides the job role or security level settings for the user.

As an example, a teleconference may include individuals A, B, and C having a job role of software developer, individual D having a job role of a project manager, and individuals E and F having job roles as managers. In this example, topic content access rules identify managers (i.e., individuals D, E, and F) as the only individuals with a right to hear confidential information regarding an amount of money associated with a customer deal. The topic content access rules also identify all other individuals (i.e., individuals A, B, and C) as not having that right to hear discussions regarding money.

As a user puts on a voice communication headset according to illustrative embodiments, the voice communication headset sends the skull conduction frequency biometric sample corresponding to the user to a voice communication server computer for identifying the user. The voice communication server computer matches the received skull conduction frequency biometric sample with a skull conduction frequency biometric template stored in the database to accurately identify the user. In addition, the voice communication server computer determines properties associated with the user, such as, for example, job role, security level clearance, authorized topics, unauthorized topics, and the like, using information stored in the database. The server also accesses a topic content access rule-set from the initial registration process stored in the database.

Continuous analysis of voice communication content allows the voice communication server computer to programmatically monitor the telephonic conversation. For example, the voice communication server computer converts speech to text. The voice communication server computer utilizes regular expressions to fine-tune the process. Lemmatization may focus on core lemma's. Lemmatization is a process of grouping together inflected forms of a word so that the inflected forms can be analyzed as a single item, identified by the word's lemma or dictionary form. For example, the verb "to walk" may appear as "walk", "walked", "walks", or "walking". The base form "walk" is the lemma for the word. In addition, the voice communication server computer breaks down phrases into subject, object, predicate, and the like and classifies them. The voice communication server computer classifies the phrases in order to understand the topic being discussed. The voice communication server computer compares the topic being discussed with the topic content access rule-set to determine whether any of individuals participating in the telephonic voice communication is unauthorized to hear the topic and take appropriate action when needed.

Further, the voice communication server computer adjusts the classifiers to predict upcoming topics. For example, the voice communication server computer may utilize certain words or phrases as a predecessor to a specific topic. For example, a conversation centered around "our negotiations with the client" may precede a discussion about money. A user authorized to hear a discussion on money (e.g., manager F from the example above) may have forgotten which individuals are participating in the teleconference and start discussing money. However, the voice communication server computer automatically mutes the confidential money discussion from users unauthorized to hear that information. As the topic changes from money to product development, for example, the voice communication server computer allows all participants to hear the discussion again. Furthermore, the voice communication server computer monitors received skull conduction frequency biometric samples at predefined time intervals in order to determine whether the same individual at the start of the teleconference is still the person who is using the voice communication headset connected to the teleconference.

With reference now to FIG. 3, a diagram illustrating an example of a topic content access management system is depicted in accordance with an illustrative embodiment. Topic content access management system 300 is a system of software and hardware components for controlling access to confidential content or information by one or more telephonic voice communication participants not authorized to hear the confidential content based on job roles and security clearance levels associated with the telephonic voice communication participants. Topic content access management system 300 may be implemented in a network of data processing systems, such as network data processing system 100 in FIG. 1.

In this example, topic content access management system 300 includes voice communication server 302, client 304, and voice communication headset 306. However, it should be noted that topic content access management system 300 is only meant as an example and not as a limitation on illustrative embodiments. In other words, topic content access management system 300 may include any number of voice communication server computers, client devices, voice communication headsets, and other devices not shown.

Voice communication server 302 may be, for example, server 104 in FIG. 1 or data processing system 200 in FIG. 2. Client device 304 and voice communication headset 306 may be, for example, client 110 and headset 116 in FIG. 1. Also, it should be noted that voice communication headset 306 is wire or wirelessly coupled to client device 304 and client device 304 is connected to voice communication server 302 via a network, such as network 102 in FIG. 1. User 308 utilizes voice communication headset 306 to conduct voice communications with users of other voice communication headsets coupled to respective client devices, which also are connected to voice communication server 302.

Voice communication headset 306 includes skull conduction speaker 310 and skull conduction microphone 312. Skull conduction speaker 310 sends an audio signal through the skull of user 308 to produce a skull conduction frequency. Skull conduction microphone 312 measures and records the skull conduction frequency of the audio signal to generate skull conduction frequency biometric sample 314, which uniquely corresponds to user 308. Voice communication headset 306 sends skull conduction frequency biometric sample 314 to voice communication server 302 to verify an identity of user 308.

Voice communication server 302 includes topic content access manager 316, such as topic content access manager 218 in FIG. 2, and database 318. After receiving skull conduction frequency biometric sample 314, topic content access manager 316 searches database 318 to find skull conduction frequency biometric template 320, which matches skull conduction frequency biometric sample 314. Skull conduction frequency biometric template 320 includes identity 322, which specifically identifies user 308.

After authenticating the identity of user 308 based on matching skull conduction frequency biometric sample 314 to skull conduction frequency biometric template 320, topic content access manager 316 uses identity 322 to retrieve user profile 324, which corresponds to user 308. User profile 324 includes job role 326 and security clearance level 328 of user 308. Topic content access manager 316 uses job role 326 and security clearance level 328 to retrieve topic content access rules 330. Topic content access rules 330 represent a set of one or more rules for identifying which topics user 308 is authorized to hear, such as authorized topics 332, and which topics user 308 is not authorized to hear, such as unauthorized topics 334, based on job role 326 and security clearance level 328 assigned to user 308.

Topic content access manager 316 continually identifies list of currently joined teleconference participants 336. List of currently joined teleconference participants 336 represents a listing of two or more participants, one of which is user 308, involved in a voice communication session. It should be noted that topic content access manager 316 performs the process above for each participant involved in the voice communication session so that topic content access manager 316 knows what topics each participant is authorized to hear during a voice communication session.

In addition, topic content access manager 316 analyzes voice communications content 338 corresponding to the voice communications between user 308 and the other participants to determine topic 340. Topic content access manager 316 may determine topic 340 using, for example, natural language processing and classification techniques. In response to topic content access manager 316 determining that a set of one or more of the voice communication participants are not authorized to hear topic 340, topic content access manager 316 mutes a voice communication channel corresponding to each participant in the set of voice communication participants are not authorized to hear topic 340 while topic 340 is being discussed in real time. In response to topic content access manager 316 determining that topic 340 in no longer being discussed, topic content access manage 316 unmutes the voice communication channels corresponding to the set of voice communication participants are not authorized to hear topic 340. Topic content access manager 316 continues this process until the voice communication session is ended.

Figure 4:
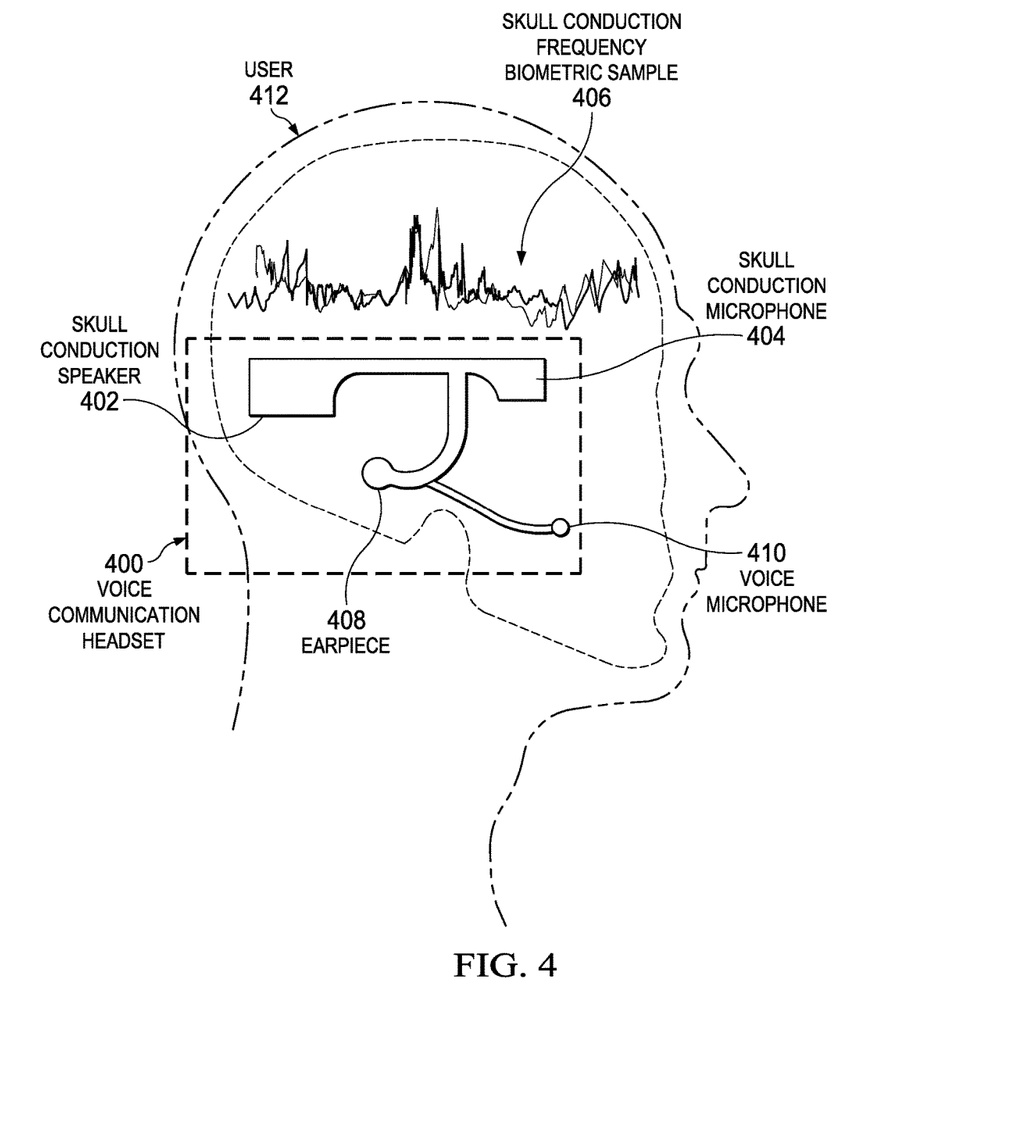
FIG. 4 is an example of a voice communication headset in accordance with an illustrative embodiment.

With reference now to FIG. 4, an example of a voice communication headset is depicted in accordance with an illustrative embodiment. Voice communication headset 400 may be, for example, voice communication headset 306 in FIG. 3. It should be noted that voice communication headset 400 is a specific example of just one type of voice communication headset of illustrative embodiments. In other words, different illustrative embodiments may utilize different types of headsets that include skull conduction speaker 402 and skull conduction microphone 404. Skull conduction speaker 402 and skull conduction microphone 404 may be, for example, skull conduction speaker 310 and skull conduction microphone 312 in FIG. 3. Voice communication headset 400 identifies, records, and transmits skull conduction frequency biometric sample 406, such as skull conduction frequency biometric sample 314 in FIG. 3.

Voice communication headset 400 also includes earpiece 408 and voice microphone 410. Earpiece 408 may fit over and conduct voice communication audio signals into the auditory canal of user 412. User 412 may be, for example, user 308 in FIG. 3. Voice microphone 410 may pick up and transmit speech of user 412 during voice communication sessions.

Figure 5A:
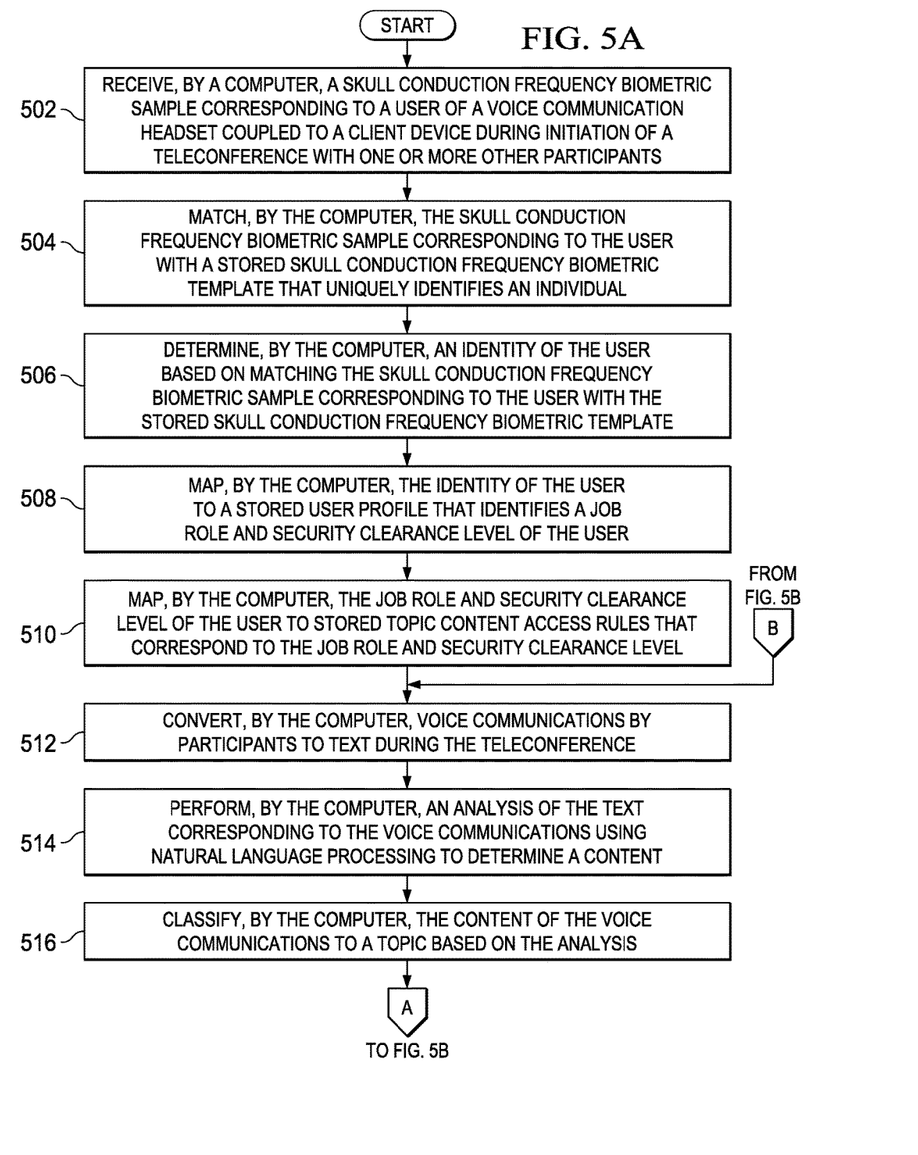
FIGS. 5A-5B are a flowchart illustrating a process for managing access to confidential content in accordance with an illustrative embodiment.
Figure 5B:
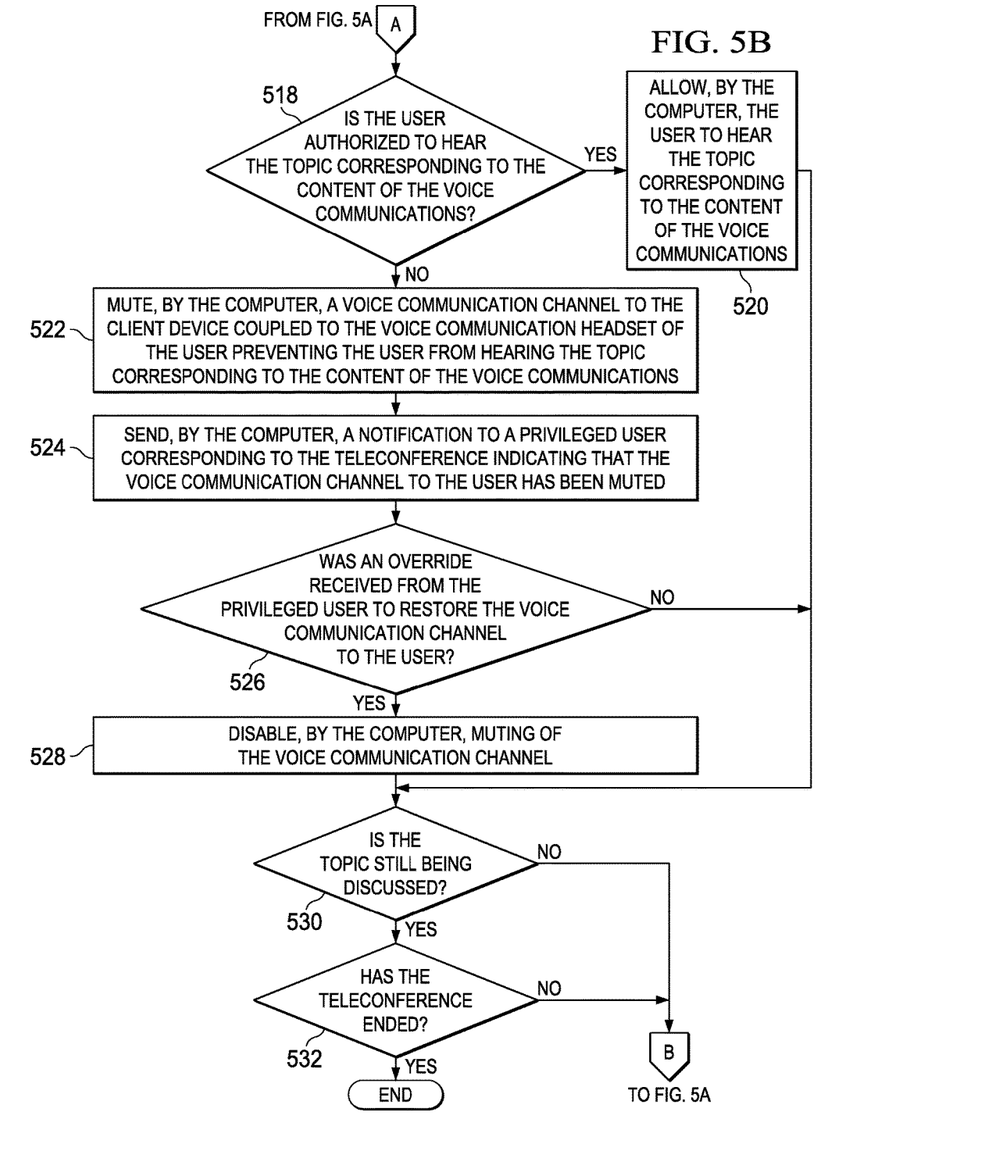

With reference now to FIGS. 5A-5B, a flowchart illustrating a process for managing access to confidential content is shown in accordance with an illustrative embodiment. The process shown in FIGS. 5A-5B may be implemented in a computer, such as, for example, server 104 in FIG. 1 or data processing system 200 in FIG. 2.

The process begins when the computer receives a skull conduction frequency biometric sample corresponding to a user of a voice communication headset coupled to a client device during initiation of a teleconference with one or more other participants (step 502). The skull conduction frequency biometric sample corresponding to the user of the voice communication headset coupled to the client device may be, for example, skull conduction frequency biometric sample 314 corresponding to user 308 of voice communication headset 306 coupled to client device 304 in FIG. 3. The computer matches the skull conduction frequency biometric sample corresponding to the user with a stored skull conduction frequency biometric template, such as skull conduction frequency biometric template 320 in FIG. 3, that uniquely identifies an individual (step 504).

The computer determines an identity, such as identity 322 of FIG. 3, of the user based on matching the skull conduction frequency biometric sample corresponding to the user with the stored skull conduction frequency biometric template (step 506). The computer maps the identity of the user to a stored user profile that identifies a job role and security clearance level of the user, such as user profile 324, which identifies job role 326 and security clearance level 328 of user 308 in FIG. 3 (step 508). Further, the computer maps the job role and security clearance level of the user to stored topic content access rules, such as topic content access rules 330 in FIG. 3, that correspond to the job role and security clearance level (step 510).

The computer converts voice communications by participants to text during the teleconference (step 512). Furthermore, the computer performs an analysis of the text corresponding to the voice communications using natural language processing to determine a content (step 514). Moreover, the computer classifies the content of the voice communications to a topic based on the analysis (step 516).

Afterward, the computer makes a determination as to whether the user is authorized to hear the topic corresponding to the content of the voice communications based on the stored topic content access rules (step 518). If the computer determines that the user is authorized to hear the topic corresponding to the content of the voice communications based on the stored topic content access rules, yes output of step 518, then the computer allows the user to hear the topic corresponding to the content of the voice communications (step 520). Thereafter, the process proceeds to step 530. If the computer determines that the user is not authorized to hear the topic corresponding to the content of the voice communications based on the stored topic content access rules, no output of step 518, then the computer mutes a voice communication channel to the client device coupled to the voice communication headset of the user preventing the user from hearing the topic corresponding to the content of the voice communications (step 522).

In addition, the computer sends a notification to a privileged user corresponding to the teleconference indicating that the voice communication channel to the user has been muted (step 524). The computer makes a determination as to whether an override was received from the privileged user to restore the voice communication channel to the user (step 526). If the computer determines that an override was not received from the privileged user to restore the voice communication channel to the user, no output of step 526, then the process proceeds to step 530. If the computer determines that an override was received from the privileged user to restore the voice communication channel to the user, yes output of step 526, then the computer disables muting of the voice communication channel (step 528).

Subsequently, the computer makes a determination as to whether the topic is still being discussed (step 530). If the computer determines that the topic is not being discussed, no output of step 530, then the process returns to step 512 where the computer continues to convert the voice communications to text for analysis. If the computer determines that the topic is still being discussed, yes output of step 530, then the computer makes a determination as to whether the teleconference ended (step 532). If the computer determines that the teleconference has not ended, no output of step 532, then the process returns to step 512 where the computer continues to convert the voice communications to text for analysis. If the computer determines that the teleconference has ended, yes output of step 532, then the process terminates thereafter.

Figure 6:
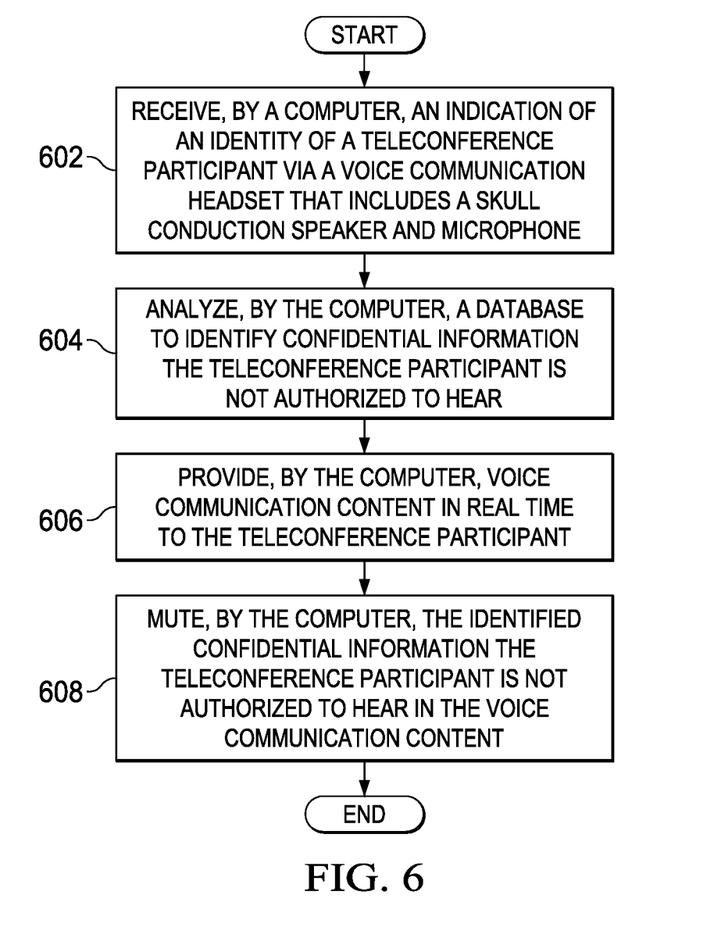
FIG. 6 is a flowchart illustrating a process for muting confidential information in accordance with an illustrative embodiment.

With reference now to FIG. 6, a flowchart illustrating a process for muting confidential information is shown in accordance with an illustrative embodiment. The process shown in FIG. 6 may be implemented in a computer, such as, for example, server 104 in FIG. 1 or data processing system 200 in FIG. 2.

The process begins when the computer receives an indication of an identity of a teleconference participant via a voice communication headset that includes a skull conduction speaker and microphone, such as voice communication headset 306 that includes skull conduction speaker 310 and skull conduction microphone 312 in FIG. 3 (step 602). The computer analyzes a database, such as database 318 in FIG. 3, to identify confidential information the teleconference participant is not authorized to hear, such as unauthorized topics 334 in FIG. 3 (step 604). The computer provides voice communication content in real time to the teleconference participant (step 606). Further, the computer mutes the identified confidential information the teleconference participant is not authorized to hear in the voice communication content (step 608).

Thus, illustrative embodiments of the present invention provide a computer-implemented method, computer system, and computer program product for managing an ability of teleconference participants to hear confidential content in teleconference voice communications using skull conduction frequency biometric identification of the teleconference participants. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing access to confidential content, the computer-implemented method comprising:
   providing, by the computer, voice communication content in real time to a teleconference participant;
   receiving, by a computer, an indication of a first identity of a teleconference participant via a voice communication headset that includes a skull conduction speaker and microphone;
   analyzing, by the computer, a database to identify confidential information in the voice communication content, wherein the confidential information identified in the voice communication content comprises information that the teleconference participant is not authorized to hear;
   muting, by the computer, the confidential information identified in the voice communication content that the teleconference participant is not authorized to hear; and
   responsive to the computer determining that a user is not authorized to hear a topic corresponding to content of voice communications based on stored topic content access rules, muting, by the computer, a voice communication channel to a client device coupled to the voice communication headset, wherein the user is prevented from hearing the topic.

2. The computer-implemented method of claim 1 further comprising:
   receiving, by the computer, a skull conduction frequency biometric sample corresponding to the user of the voice communication headset coupled to the client device during initiation of a teleconference with one or more other participants.

3. The computer-implemented method of claim 2 further comprising:
   matching, by the computer, the skull conduction frequency biometric sample corresponding to the user with a stored skull conduction frequency biometric template that uniquely identifies an individual; and
   determining, by the computer, a second identity of the user based on matching the skull conduction frequency biometric sample corresponding to the user with the stored skull conduction frequency biometric template.

4. The computer-implemented method of claim 3 further comprising:
   first mapping, by the computer, the second identity to a stored user profile that identifies a job role and a security clearance level of the user.

5. The computer-implemented method of claim 4 further comprising:
   second mapping, by the computer, the job role and the security clearance level of the user to stored topic content access rules that correspond to the job role and the security clearance level.

6. The computer-implemented method of claim 5 further comprising:
   sending, by the computer, a notification to a privileged user corresponding to the teleconference indicating that the voice communication channel to the user has been muted.

7. The computer-implemented method of claim 6 further comprising:
   responsive to the computer determining that an override was received from the privileged user to restore the voice communication channel to the user, disabling, by the computer, the muting of the voice communication channel.

8. The computer-implemented method of claim 1 further comprising:
   converting, by the computer, voice communications by participants to text during a teleconference; and
   determining, by the computer, the voice communication content using natural language processing.

9. The computer-implemented method of claim 8 further comprising:
   classifying, by the computer, the voice communication content to the topic based on the natural language processing.

10. The computer-implemented method of claim 9, wherein the computer predicts upcoming topics in the voice communications based on a stored list of keywords and phrases that correspond to specific topics.

11. The computer system for managing access to confidential content, the computer system comprising:
    a bus system;
    a storage device connected to the bus system, wherein the storage device stores program instructions; and
    a processor connected to the bus system, wherein the processor executes the program instructions to:
      receive an indication of a first identity of a teleconference participant via a voice communication headset that includes a skull conduction speaker and microphone;
      generate identified confidential information by analyzing a database to identify confidential information the teleconference participant is not authorized to hear;
      provide voice communication content in real time to the teleconference participant;

mute the identified confidential information the teleconference participant is not authorized to hear in the voice communication content; and responsive to determining that a user is not authorized to hear a topic corresponding to voice communication content based on stored topic content access rules, muting a voice communication channel to a client device coupled to the voice communication headset, wherein the user is prevented from hearing the topic.

12. The computer system of claim 11, wherein the processor further executes the program instructions to:

receive a skull conduction frequency biometric sample corresponding to the user of the voice communication headset coupled to the client device during initiation of a teleconference with one or more other participants;

match the skull conduction frequency biometric sample corresponding to the user with a stored skull conduction frequency biometric template that uniquely identifies an individual; and determine a second identity of the user based on matching the skull conduction frequency biometric sample corresponding to the user with the stored skull conduction frequency biometric template, wherein the second identity is the first identity, and the user is the teleconference participant.

13. A computer program product for managing access to confidential content, the computer program product comprising:

a computer readable storage medium having program instructions embodied therewith, the program instructions configured to cause a computer to:

receive an indication of a first identity of a teleconference participant via a voice communication headset that includes a skull conduction speaker and a skull conduction microphone;

generate identified confidential information by analyzing a database to identify confidential information the teleconference participant is not authorized to hear;

provide voice communication content in real time to the teleconference participant;

mute the identified confidential information the teleconference participant is not authorized to hear in the voice communication content; and responsive to determining that a user is not authorized to hear a topic corresponding to the voice communication content based on stored topic content access rules, mute a voice communication channel to a client device coupled to the voice communication headset, wherein the user is prevented from hearing the topic.

14. The computer program product of claim 13 further comprising:

receiving, by the computer, a skull conduction frequency biometric sample corresponding to the user of the voice communication headset coupled to the client device during initiation of a teleconference with one or more other participants.

15. The computer program product of claim 14 further comprising:

matching, by the computer, the skull conduction frequency biometric sample corresponding to the user with a stored skull conduction frequency biometric template that uniquely identifies an individual; and determining, by the computer, a second identity of the user based on matching the skull conduction frequency biometric sample corresponding to the user with the stored skull conduction frequency biometric template.

16. The computer program product of claim 15 further comprising:

first mapping, by the computer, the second identity of the user to a stored user profile that identifies a job role and a security clearance level of the user.

17. The computer program product of claim 16 further comprising:

second mapping, by the computer, the job role and the security clearance level of the user to stored topic content access rules that correspond to the job role and the security clearance level.

18. The computer program product of claim 17 further comprising:

sending, by the computer, a notification to a privileged user corresponding to the teleconference indicating that the voice communication channel to the user has been muted.

* * * * *